United States Patent
Gazzard et al.

(10) Patent No.: US 10,552,524 B1
(45) Date of Patent: Feb. 4, 2020

(54) SYSTEMS AND METHODS FOR IN-LINE DOCUMENT TAGGING AND OBJECT BASED DATA SYNCHRONIZATION

(71) Applicant: Palantir Technologies Inc., Palo Alto, CA (US)

(72) Inventors: Benjamin Gazzard, London (GB); Michael Gamble, Ottawa (CA)

(73) Assignee: Palantir Technolgies Inc., Palo Alto, CA (US)

(*) Notice: Subject to any disclaimer, the term of this patent is extended or adjusted under 35 U.S.C. 154(b) by 0 days.

(21) Appl. No.: 15/928,865

(22) Filed: Mar. 22, 2018

Related U.S. Application Data

(60) Provisional application No. 62/595,873, filed on Dec. 7, 2017.

(51) Int. Cl.
| | | |
|---|---|---|
| G06F 17/00 | (2019.01) | |
| G06F 17/24 | (2006.01) | |
| G06F 16/27 | (2019.01) | |
| G06F 16/93 | (2019.01) | |

(52) U.S. Cl.
CPC ............ *G06F 17/24* (2013.01); *G06F 16/27* (2019.01); *G06F 16/94* (2019.01)

(58) Field of Classification Search
CPC .... G06F 17/218; G06F 17/2235; G06F 17/24; G06F 16/27; G06F 16/94
See application file for complete search history.

(56) References Cited

U.S. PATENT DOCUMENTS

| | | |
|---|---|---|
| 5,418,950 A | 5/1995 | Li et al. |
| 5,428,737 A | 6/1995 | Li et al. |
| 5,428,776 A | 6/1995 | Rothfield |
| 5,542,089 A | 7/1996 | Lindsay et al. |

(Continued)

FOREIGN PATENT DOCUMENTS

| | | |
|---|---|---|
| DE | 102014103482 | 9/2014 |
| EP | 1647908 | 4/2006 |

(Continued)

OTHER PUBLICATIONS

"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.

(Continued)

*Primary Examiner* — Laurie A Ries
(74) *Attorney, Agent, or Firm* — Sheppard Mullin Richter & Hampton LLP

(57) ABSTRACT

Systems and methods are provided for in-line document tagging and object-based synchronization. An exemplary system may comprise one or more processors and a non-transitory computer-readable memory storing instructions that, when executed by the one or more processors, cause the system to perform a method. The method may comprise: receiving, via an in-line tagging interface, user input, the user input being associated with one or more fields of a document; applying one or more first document tags to the document, the one or more first document tags being applied in-line with the received user input; and generating a data object from the document based on the one or more documents tags, the data object being associated with an object-based data modeling framework.

20 Claims, 11 Drawing Sheets

(56) References Cited

U.S. PATENT DOCUMENTS

| | | | |
|---|---|---|---|
| 5,608,899 A | 3/1997 | Li et al. | |
| 5,613,105 A | 3/1997 | Xbikowski et al. | |
| 5,701,456 A | 12/1997 | Jacopi et al. | |
| 5,724,575 A | 3/1998 | Hoover et al. | |
| 5,794,228 A | 8/1998 | French et al. | |
| 5,794,229 A | 8/1998 | French et al. | |
| 5,857,329 A | 1/1999 | Bingham | |
| 5,878,421 A * | 3/1999 | Ferrel | G06F 17/212 |
| 5,911,138 A | 6/1999 | Li et al. | |
| 5,918,225 A | 6/1999 | White et al. | |
| 6,157,930 A * | 12/2000 | Ballard | G06F 17/30902 |
| 6,208,985 B1 | 3/2001 | Krehel | |
| 6,230,173 B1 * | 5/2001 | Ferrel | G06F 17/218 |
| | | | 715/205 |
| 6,236,994 B1 | 5/2001 | Swartz et al. | |
| 6,289,334 B1 | 9/2001 | Reiner et al. | |
| 6,311,181 B1 | 10/2001 | Lee et al. | |
| 6,321,274 B1 | 11/2001 | Shakib et al. | |
| 6,643,613 B2 | 11/2003 | McGee et al. | |
| 6,745,382 B1 | 6/2004 | Zothner | |
| 6,851,108 B1 | 2/2005 | Syme et al. | |
| 6,857,120 B1 | 2/2005 | Arnold et al. | |
| 6,877,137 B1 | 4/2005 | Rivette et al. | |
| 6,976,024 B1 | 12/2005 | Chavez et al. | |
| 7,028,223 B1 | 4/2006 | Kolawa et al. | |
| 7,085,890 B2 | 8/2006 | Kashyap | |
| 7,155,728 B1 | 12/2006 | Prabhu et al. | |
| 7,216,133 B2 | 5/2007 | Wu et al. | |
| 7,219,305 B2 * | 5/2007 | Jennings | G06F 8/38 |
| | | | 715/761 |
| 7,406,592 B1 | 7/2008 | Polyudov | |
| 7,519,589 B2 | 4/2009 | Charnock et al. | |
| 7,546,353 B2 | 6/2009 | Hesselink et al. | |
| 7,610,290 B2 | 10/2009 | Kruy et al. | |
| 7,627,489 B2 | 12/2009 | Schaeffer et al. | |
| 7,783,679 B2 | 8/2010 | Bley | |
| 7,853,573 B2 | 12/2010 | Warner et al. | |
| 7,877,421 B2 | 1/2011 | Berger et al. | |
| 7,908,521 B2 | 3/2011 | Sridharan et al. | |
| 7,979,424 B2 | 7/2011 | Dettinger et al. | |
| 8,073,857 B2 | 12/2011 | Sreekanth | |
| 8,103,962 B2 | 1/2012 | Embley et al. | |
| 8,417,715 B1 | 4/2013 | Bruckhaus et al. | |
| 8,429,194 B2 | 4/2013 | Aymeloglu et al. | |
| 8,433,702 B1 | 4/2013 | Carrino et al. | |
| 8,499,287 B2 | 7/2013 | Shafi et al. | |
| 8,560,494 B1 | 10/2013 | Downing | |
| 8,639,552 B1 | 1/2014 | Chen et al. | |
| 8,799,867 B1 | 8/2014 | Peri-Glass et al. | |
| 8,909,597 B2 | 12/2014 | Aymeloglu et al. | |
| 8,924,429 B1 | 12/2014 | Fisher et al. | |
| 8,935,201 B1 | 1/2015 | Fisher et al. | |
| 9,031,981 B1 | 5/2015 | Potter et al. | |
| 9,105,000 B1 | 8/2015 | White et al. | |
| 9,268,748 B2 * | 2/2016 | Davis | G06F 17/218 |
| 9,292,388 B2 | 3/2016 | Fisher et al. | |
| 9,330,120 B2 | 5/2016 | Colgrove et al. | |
| 9,348,677 B2 | 5/2016 | Marinelli, III et al. | |
| 9,378,526 B2 | 6/2016 | Sampson | |
| 9,544,383 B1 * | 1/2017 | Calkins | H04L 67/24 |
| 9,740,369 B2 * | 8/2017 | Sun | G06F 3/0482 |
| 2002/0184111 A1 | 12/2002 | Swanson | |
| 2002/0188636 A1 * | 12/2002 | Peck | G06F 17/24 |
| | | | 715/255 |
| 2003/0004770 A1 | 1/2003 | Miller et al. | |
| 2003/0023620 A1 | 1/2003 | Trotta | |
| 2003/0105833 A1 | 6/2003 | Daniels | |
| 2003/0212670 A1 | 11/2003 | Yalamanchi et al. | |
| 2004/0088177 A1 | 5/2004 | Travis et al. | |
| 2004/0098731 A1 | 5/2004 | Demsey et al. | |
| 2004/0103088 A1 | 5/2004 | Cragun et al. | |
| 2004/0126840 A1 | 7/2004 | Cheng et al. | |
| 2004/0139212 A1 | 7/2004 | Mukherjee et al. | |
| 2004/0153837 A1 | 8/2004 | Preston et al. | |
| 2004/0193608 A1 | 9/2004 | Gollapudi et al. | |
| 2004/0254658 A1 | 12/2004 | Sherriff et al. | |
| 2004/0260702 A1 | 12/2004 | Cragun et al. | |
| 2005/0004911 A1 | 1/2005 | Goldberg et al. | |
| 2005/0021397 A1 | 1/2005 | Cui et al. | |
| 2005/0120080 A1 | 6/2005 | Weinreb et al. | |
| 2005/0183005 A1 | 8/2005 | Denoue et al. | |
| 2005/0226473 A1 | 10/2005 | Ramesh | |
| 2005/0278286 A1 | 12/2005 | Djugash et al. | |
| 2006/0004740 A1 | 1/2006 | Dettinger et al. | |
| 2006/0070046 A1 | 3/2006 | Balakrishnan et al. | |
| 2006/0074967 A1 | 4/2006 | Shaburov | |
| 2006/0080616 A1 | 4/2006 | Vogel et al. | |
| 2006/0116991 A1 | 6/2006 | Calderwood | |
| 2006/0129992 A1 | 6/2006 | Oberholtzer et al. | |
| 2006/0142949 A1 | 6/2006 | Helt | |
| 2006/0209085 A1 | 9/2006 | Wong et al. | |
| 2006/0271838 A1 | 11/2006 | Carro | |
| 2006/0271884 A1 | 11/2006 | Hurst | |
| 2006/0288046 A1 | 12/2006 | Gupta et al. | |
| 2007/0005582 A1 | 1/2007 | Navratil et al. | |
| 2007/0027851 A1 | 2/2007 | Kruy et al. | |
| 2007/0094248 A1 | 4/2007 | McVeigh et al. | |
| 2007/0113164 A1 | 5/2007 | Hansen et al. | |
| 2007/0150805 A1 | 6/2007 | Misovski | |
| 2007/0168336 A1 | 7/2007 | Ransil et al. | |
| 2007/0178501 A1 | 8/2007 | Rabinowitz et al. | |
| 2007/0192281 A1 | 8/2007 | Cradick et al. | |
| 2007/0260582 A1 | 11/2007 | Liang | |
| 2008/0046809 A1 * | 2/2008 | Oshima | G06F 17/24 |
| | | | 715/234 |
| 2008/0126344 A1 | 5/2008 | Hoffman et al. | |
| 2008/0126951 A1 | 5/2008 | Sood et al. | |
| 2008/0155440 A1 | 6/2008 | Trevor et al. | |
| 2008/0196016 A1 | 8/2008 | Todd | |
| 2008/0201313 A1 | 8/2008 | Dettinger et al. | |
| 2008/0215543 A1 | 9/2008 | Huang et al. | |
| 2008/0222513 A1 * | 9/2008 | Van Den Berge | H04N 1/00209 |
| | | | 715/234 |
| 2008/0267386 A1 | 10/2008 | Cooper | |
| 2008/0282139 A1 * | 11/2008 | Davis | G06F 17/212 |
| | | | 715/205 |
| 2008/0288862 A1 * | 11/2008 | Smetters | G06F 17/218 |
| | | | 715/255 |
| 2009/0006150 A1 | 1/2009 | Prigge et al. | |
| 2009/0007056 A1 | 1/2009 | Prigge et al. | |
| 2009/0043762 A1 | 2/2009 | Shiverick et al. | |
| 2009/0055487 A1 | 2/2009 | Moraes et al. | |
| 2009/0083275 A1 | 3/2009 | Jacob et al. | |
| 2009/0094217 A1 | 4/2009 | Dettinger et al. | |
| 2009/0144747 A1 | 6/2009 | Baker | |
| 2009/0161147 A1 | 6/2009 | Klave | |
| 2009/0172674 A1 | 7/2009 | Bobak et al. | |
| 2009/0187556 A1 | 7/2009 | Ross et al. | |
| 2009/0193012 A1 | 7/2009 | Williams | |
| 2009/0199047 A1 | 8/2009 | Vaitheeswaran et al. | |
| 2009/0248721 A1 | 10/2009 | Burton et al. | |
| 2009/0249178 A1 * | 10/2009 | Ambrosino | G06F 17/2229 |
| | | | 715/205 |
| 2009/0282068 A1 | 11/2009 | Shockro et al. | |
| 2009/0299830 A1 | 12/2009 | West et al. | |
| 2010/0011282 A1 | 1/2010 | Dollard et al. | |
| 2010/0070464 A1 | 3/2010 | Aymeloglu et al. | |
| 2010/0073315 A1 | 3/2010 | Lee et al. | |
| 2010/0082671 A1 | 4/2010 | Li et al. | |
| 2010/0145902 A1 | 6/2010 | Boyan et al. | |
| 2010/0161646 A1 | 6/2010 | Ceballos et al. | |
| 2010/0169376 A1 | 7/2010 | Chu | |
| 2010/0169405 A1 | 7/2010 | Zhang | |
| 2010/0199167 A1 | 8/2010 | Uematsu et al. | |
| 2010/0313119 A1 | 12/2010 | Baldwin et al. | |
| 2011/0035396 A1 | 2/2011 | Merz et al. | |
| 2011/0041084 A1 | 2/2011 | Karam | |
| 2011/0066497 A1 | 3/2011 | Gopinath et al. | |
| 2011/0074811 A1 | 3/2011 | Hanson et al. | |
| 2011/0093489 A1 * | 4/2011 | Gawor | G06F 16/353 |
| | | | 707/769 |
| 2011/0093490 A1 | 4/2011 | Schindlauer et al. | |
| 2011/0131547 A1 | 6/2011 | Elaasar | |

(56) References Cited

U.S. PATENT DOCUMENTS

| | | |
|---|---|---|
| 2011/0145401 A1 | 6/2011 | Westlake |
| 2011/0208822 A1 | 8/2011 | Rathod |
| 2011/0252282 A1 | 10/2011 | Meek et al. |
| 2011/0258216 A1 | 10/2011 | Supakkul et al. |
| 2011/0270871 A1 | 11/2011 | He et al. |
| 2011/0321008 A1 | 12/2011 | Jhoney et al. |
| 2012/0078595 A1 | 3/2012 | Balandin et al. |
| 2012/0102022 A1 | 4/2012 | Miranker et al. |
| 2012/0159304 A1* | 6/2012 | Listou ............... G06F 17/30365 715/227 |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0284719 A1 | 11/2012 | Phan et al. |
| 2013/0024268 A1 | 1/2013 | Manickavelu |
| 2013/0024731 A1 | 1/2013 | Shochat et al. |
| 2013/0054551 A1 | 2/2013 | Lange |
| 2013/0086482 A1 | 4/2013 | Parsons |
| 2013/0095864 A1* | 4/2013 | Marovets ................ H04W 4/14 455/466 |
| 2013/0096968 A1 | 4/2013 | Van Pelt et al. |
| 2013/0166550 A1* | 6/2013 | Buchmann ........ G06F 17/30997 707/736 |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2014/0012886 A1 | 1/2014 | Downing et al. |
| 2014/0074888 A1 | 3/2014 | Potter et al. |
| 2014/0108074 A1 | 4/2014 | Miller et al. |
| 2014/0115589 A1 | 4/2014 | Marinelli, III et al. |
| 2014/0115610 A1 | 4/2014 | Marinelli, III et al. |
| 2014/0214579 A1 | 7/2014 | Shen et al. |
| 2014/0244388 A1 | 8/2014 | Manouchehri et al. |
| 2015/0112641 A1 | 4/2015 | Faraj |
| 2015/0135056 A1* | 5/2015 | Sekharan ............. G06F 16/972 715/234 |
| 2015/0269030 A1 | 9/2015 | Fisher et al. |
| 2015/0379098 A1* | 12/2015 | Im .................... G06F 17/30038 707/749 |
| 2016/0026923 A1 | 1/2016 | Erenrich et al. |
| 2016/0117296 A1* | 4/2016 | Warila ...................... G06F 8/24 715/234 |
| 2017/0199848 A1* | 7/2017 | Fein ...................... G06F 17/218 |
| 2017/0315967 A1* | 11/2017 | Boucher ................. G06F 7/544 |
| 2017/0315968 A1* | 11/2017 | Boucher ............. G06F 3/04847 |
| 2018/0232352 A1* | 8/2018 | Fulford ................ G06F 17/212 |

FOREIGN PATENT DOCUMENTS

| | | |
|---|---|---|
| EP | 2 634 745 | 9/2013 |
| EP | 2743839 | 6/2014 |
| EP | 2778986 | 9/2014 |
| EP | 2921975 | 9/2015 |
| GB | 2366498 | 3/2002 |
| GB | 2508503 | 1/2015 |
| GB | 2508293 | 4/2015 |
| HK | 1194178 | 9/2015 |
| NZ | 622485 | 3/2015 |
| NZ | 616212 | 5/2015 |
| NZ | 616299 | 7/2015 |
| WO | WO 2000/034895 | 6/2000 |
| WO | WO 2010/030917 | 3/2010 |
| WO | WO 2013/030595 | 3/2013 |

OTHER PUBLICATIONS

Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.

Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.

Delicious, <http://delicious.com/> as printed May 15, 2014 in 1 page.

Donjerkovic et al., "Probabilistic Optimization of Top N Queries," Proceedings of the 25th VLDB Conference, Edinburgh, Scotland, 1999, pp. 411-422.

Fang et al., "Computing Iceberg Queries Efficiently," Proceedings of the 24th VLDB Conference New York, 1998, pp. 299-310.

Frantisek et al., "An Architectural View of Distributed Objects and Components in CORBA, Java RMI and COM/DCOM," Software—Concepts & Tools, vol. 19, No. 1, Jun. 1, 1998, pp. 14-28.

Ivanova et al., "An Architecture for Recycling Intermediates in a Column-Store," Proceedings of the 35th Sigmod International Conference on Management of Data, Sigmod '09, Jun. 29, 2009, p. 309.

Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.

Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.

Leela et al., "On Incorporating Iceberg Queries in Query Processors," Technical Report, TR-2002-01, Database Systems for Advanced Applications Lecture Notes in Computer Science, 2004, vol. 2973.

Sigrist, et al., "PROSITE, a Protein Domain Database for Functional Characterization and Annotation," Nucleic Acids Research, 2010, vol. 38, pp. D161-D166.

* cited by examiner

In-line tagging interface 301     REPORT

Title: The Ultimate Cheese Problem

Summary: She travelling acceptance men unpleasant her especially entreaties law. Law forth but end any arise chief arose. Old her say learn these large. Joy fond many ham high seen this.

Few preferred continual sir led incommode neglected. Discovered too old insensible collecting unpleasant but invitation.

John Doe pain weight profess gain sky.

311

Object Search for "John Doe"

John Doe's Profile
Name:.....
Email: .....
Address: .....

Local News
Document title: .....

John Doe's activities
Document title: .....

...

+ Create New Object for "John Doe"

312

John Doe's Profile

Phone number:.....
Address: .....
Nationality: ...
Name: John Doe
Email: Johndoe@email.com
....

+ Add Tag

FIGURE 3A

In-line tagging interface 302   REPORT

Title    The Ultimate Cheese Problem

Summary   She travelling acceptance men unpleasant her especially entreaties law. Law forth but end any arise chief arose. Old her say learn these large. Joy fond many ham high seen this.

Few preferred continual sir led incommode neglected. Discovered too old insensible collecting unpleasant but invitation.

John Doe pain weight profess gain sky.

Note    @John Doe

313

Object Search for "John Doe"

John Doe's Profile
Name:.....
Email: .....
Address: .....

Local News
Document title: .....

John Doe's activities
Document title: .....

...

+ Create New Object for "John Doe"

314

John Doe's Profile

Phone number:.....

Address: .....

Nationality: ...

Name: John Doe

Email: Johndoe@email.com

....

+ Add Tag

FIGURE 3B

In-line tagging interface 303   REPORT

Title: The Ultimate Cheese Problem

Summary:
She travelling acceptance men unpleasant her especially entreaties law. Law forth but end any arise chief arose. Old her say learn these large. Joy fond many ham high seen this.

Few preferred continual sir led incommode neglected. Discovered too old insensible collecting unpleasant but invitation.

John Doe pain weight profess gain sky.

Note: John Doe weigh need run @John Doe

— 315

Object Search for "John Doe"

John Doe's Profile
Name:.....
Email: .....
Address: .....

Local News
Document title: .....

John Doe's activities
Document title: .....

...

+ Create New Object for "John Doe"

— 316

John Doe's Profile

Phone number:.....
Address: .....
Nationality: ...
Name: John Doe
Email: Johndoe@email.com 
....

+ Add Tag

FIGURE 3C

In-line tagging interface 304     REPORT

Title — The Ultimate Cheese Problem

Summary —
She travelling acceptance men unpleasant her especially entreaties law. Law forth but end any arise chief arose. Old her say learn these large. Joy fond many ham high seen this.

Few preferred continual sir led incommode neglected. Discovered too old insensible collecting unpleasant but invitation.

[John Doe] pain weight profess gain sky.

Note — [John Doe] weigh need run [Johndoe@email.com]

Save

317 →

Generated object view

Title
The Ultimate Cheese Problem

Summary
She travelling acceptance men unpleasant her especially entreaties law. Law forth but end any arise chief arose. Old her say learn these large. Joy fond many ham high seen this.

Few preferred continual sir led incommode neglected. Discovered too old insensible collecting unpleasant but invitation.

[John Doe] pain weight profess gain sky.

Note
[John Doe] weigh need run [Johndoe@email.com]

FIGURE 3D

Object-based interface 305     REPORT

Title
The Ultimate Cheese Problem

Summary
She travelling acceptance men unpleasant her especially entreaties law. Law forth but end any arise chief arose. Old her say learn these large. Joy fond many ham high seen this.

Few preferred continual sir led incommode neglected. Discovered too old insensible collecting unpleasant but invitation.

John Doe  pain weight profess gain sky.

Note
  John Doe  weigh need run  Johndoe@email.com

319

Object Search for "Discovered too"

Headlines
Document title: .....

Recent discoveries
Document title: .....

...

+ Create New Object for "Discovered too"

318

John Doe's Profile

Phone number:.....
Address: .....
Nationality: ...
Name: John Doe
Email: Johndoe@email.com
    ....

+ Add Tag

FIGURE 3E

In-line tagging interface 306   REPORT

Title: The Ultimate Cheese Problem

Summary:
She travelling acceptance men unpleasant her especially entreaties law. Law forth but end any arise chief arose. Old her say learn these large. Joy fond many ham high seen this.

Few preferred continual sir led incommode neglected. Discovered too old insensible collecting unpleasant but invitation.

John Doe pain weight profess gain sky.

Note: John Doe weigh need run Johndoe@email.com

Save

FIGURE 3F

SYSTEMS AND METHODS FOR IN-LINE DOCUMENT TAGGING AND OBJECT BASED DATA SYNCHRONIZATION

CROSS REFERENCE TO RELATED APPLICATIONS

This application claims the benefit under 35 U.S.C. § 119(e) of U.S. Provisional Application Ser. No. 62/595,873, filed Dec. 7, 2017, the content of which is incorporated by reference in its entirety into the present disclosure.

FIELD OF THE INVENTION

This disclosure relates to document tagging and data synchronization.

BACKGROUND

Under some approaches, analysis platforms may support object-based data modeling frameworks. For example, analysis platforms may analyze data (e.g., reports created using traditional text editor applications) based on document tags associated with the data. However, typical text editor applications do not provide document tagging that is compatible with object-based data modeling frameworks, so document tagging is typically performed after the data has been provided to the analysis platform. This may result in the tagging being performed by users who are unfamiliar with the underlying data.

SUMMARY

Various embodiments of the present disclosure can include systems, methods, and non-transitory computer readable media for in-line document tagging and object-based synchronization. According to one aspect, an exemplary system may comprise one or more processors and a non-transitory computer-readable memory storing instructions that, when executed by the one or more processors, cause the system to perform a method. The method may comprise: receiving, via an in-line tagging interface, user input, the user input being associated with one or more fields of a document; applying one or more first document tags to the document, the one or more first document tags being applied in-line with the received user input; and generating a data object from the document based on the one or more documents tags, the data object being associated with an object-based data modeling framework.

In some embodiments, the instructions further cause the system to perform: providing the data object for storage by a datastore, the datastore comprising the object-based modeling framework.

In some embodiments, the instructions further cause the system to perform: providing, via an object-based interface under the object-based modeling framework, the data object; applying one or more second document tags to the document corresponding to the data object; and updating the data object based on the one or more second documents tags.

In some embodiments, the instructions further cause the system to perform: providing the document applied with the one or more first and second document tags.

In some embodiments, the in-line tagging interface is not object-based.

In some embodiments, applying the one or more first document tags to the document comprises at least one of: creating the first document tag to associate with the user input, or selecting the first document tag to associate with the user input.

In some embodiments, selecting the first document tag to associate with the user input comprises replacing the user input with the selected first document tag.

In some embodiments, the user input comprises a name, selecting the first document tag to associate with the user input comprises selecting a property from a profile as the first document tag to associated with the user input, and the profile is associated with the name.

According to another aspect, a method for in-line document tagging and object-based synchronization may comprise: receiving, via an in-line tagging interface, user input, the user input being associated with one or more fields of a document; applying one or more first document tags to the document, the one or more first document tags being applied in-line with the received user input; and generating a data object from the document based on the one or more documents tags, the data object being associated with an object-based data modeling framework.

According to yet another aspect, a non-transitory computer-readable memory storing instructions that, when executed by one or more processors, may cause the one or more processors to perform: receiving, via an in-line tagging interface, user input, the user input being associated with one or more fields of a document; applying one or more first document tags to the document, the one or more first document tags being applied in-line with the received user input; and generating a data object from the document based on the one or more documents tags, the data object being associated with an object-based data modeling framework.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 3A-3F illustrate example interfaces for in-line document tagging and object-based synchronization, in accordance with various embodiments.

DETAILED DESCRIPTION

Figure 1:
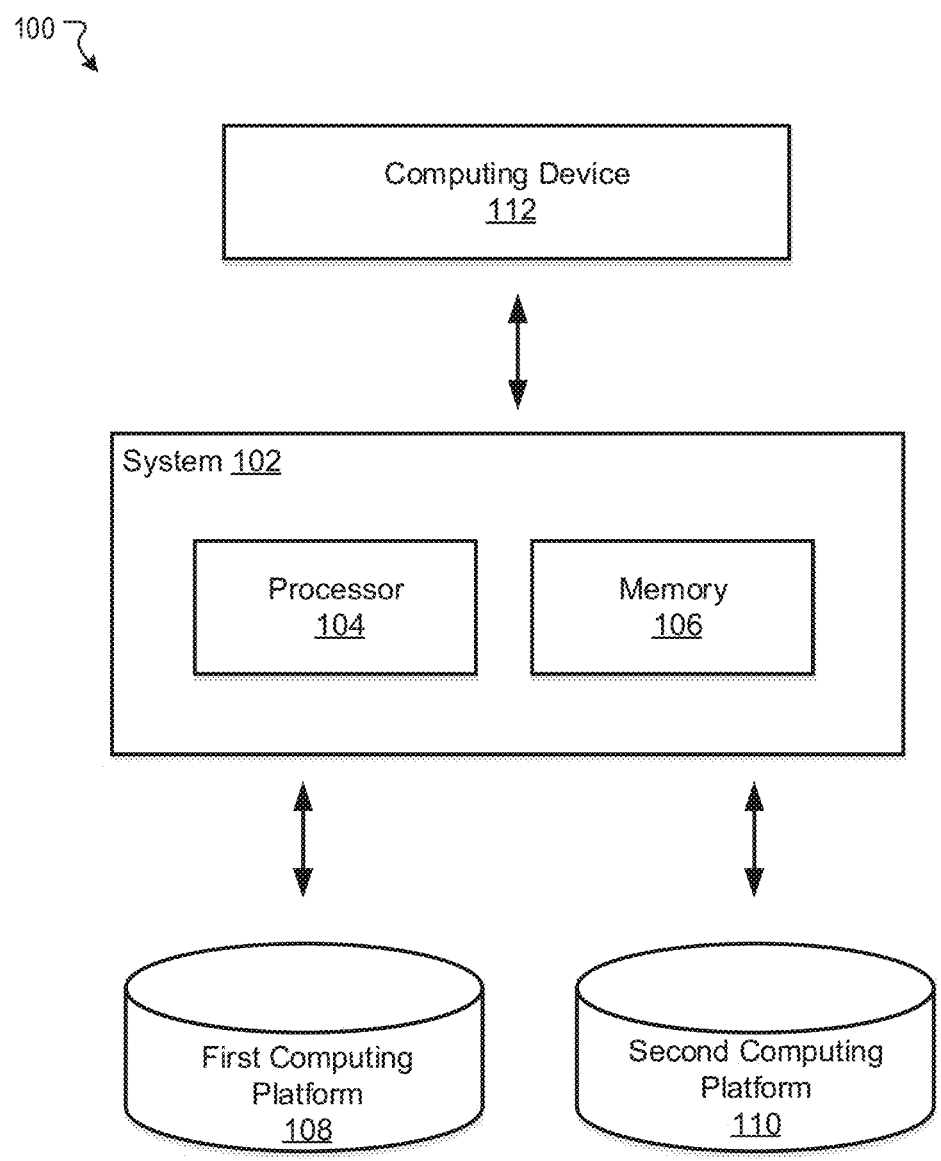
FIG. 1 illustrates an example environment for in-line document tagging and object-based synchronization, in accordance with various embodiments.

In some instances, multi-platform collaboration may be required for performing various analytic projects. For example, a first platform may store structured data (e.g., database tables) and unstructured data (e.g., text files), and a second platform may manage data using an object model. However, in the absence of links between these two platforms, any analysis completed in the first platform, such as tagging, typically cannot be associated to relevant objects or object properties stored in the second platform and vice versa. Such deficiency can cause incomplete or inaccurate analysis, and/or otherwise negatively affect the project.

Under some existing approaches, analysis platforms may support object-based data modeling frameworks. For example, analysis platforms may analyze data (e.g., a report created using a traditional text editor application) based on document tags associated with the data. However, typical text editor applications do not provide document tagging that is compatible with object-based data modeling frameworks, so document tagging is typically performed after the data has been provided to the analysis platform. This may result in the tagging being performed by users who are unfamiliar with the underlying data.

A claimed solution rooted in computer technology overcomes problems specifically arising in the realm of computer technology, at least mitigating the problems set forth above. In various implementations, a computing system is configured to provide tools that facilitate in-line tagging of documents (e.g., tagging a document during document creation) for creating and/or updating data objects suitable for analysis via an object-based data modeling framework. The system may provide a user with an in-line tagging interface for creating a document and/or applying document tags in-line. The in-line tagging interface may comprise a web-based graphical user interface. The document may include unstructured and/or structured fields. Portions of the document and/or document tags may be populated based on one or more data objects of the object-based modeling framework. The user may create and/or apply one or more document tags to one or more corresponding portions of the document. The system may transform the document into a corresponding data object based on the document tags. The data object may be stored by a datastore comprising the object-based data modeling framework.

In some embodiments, a previously created document may be edited. For example, a first user may create a document and apply one or more document tags to the document using the in-tagging interface. The system may transform the document into a corresponding data object based on the one or more document tags. Additional tag(s) may be applied (e.g., by a second user of a data analysis platform via an object-based interface). In order to edit the document, the system may load the document into the in-line tagging interface from the corresponding data object. The system may identify absolute locations of any document tags, and then remove all document tags. The system may then apply new document tags within the in-line tagging interface based on the identified absolute locations. This may allow, for example, the document to be edited (e.g., adding user input, removing user input, adding document tags, editing document tags, removing document tags, etc.) without causing shifting of previously applied document tags, which can be a common problem when editing tagged documents. Once editing is complete, the system may synchronize the edits and the corresponding data object.

FIG. 1 illustrates an example environment 100 for in-line document tagging and object-based synchronization, in accordance with various embodiments. As shown in FIG. 1, the example environment 100 can include at least one computing system 102 (e.g., computer, server) that includes one or more processors 104 and memory 106. The memory 106 may be non-transitory and computer-readable. The memory 106 may store instructions that, when executed by the one or more processors 104, cause the system 102 (e.g., the processor 104) to perform various operations described herein. The environment 100 may include a computing device 112 (e.g., computer, mobile phone) coupled to the system 102.

In some embodiments, the environment 100 may also include a first computing platform 108 and a second computing platform 110 both accessible to the system 102. For example, the first computing platform 108 may include one or more searchable databases. The first computing platform 108 may be configured to store structured and/or unstructured data (e.g., tables, text files, images) in the databases. The second computing platform 110 may include one or more searchable object models. The second computing platform 110 may be configured to store and manage data using at least one object model. An object model can store data as objects defined by object components, which can include one or more properties (e.g., textual object attributes such as names, emails, etc.), media (e.g., files, images, videos, binary data, etc.), notes (e.g., free text containers), and/or relationships with other objects.

In some embodiments, the system 102 and the computing device 112 may be integrated in a single device or system. Alternatively, the system 102 and the computing device 112 may operate individually, for example, the computing device 112 may be a mobile device or a remote computer and the system 102 may be a server. The first computing platform 108 and the second computing platform 110 may be stored anywhere accessible to the system 102, for example, in the memory 106, in another (cloud) device coupled to the system 102, etc. Various operations of the system 102 are described below in reference to FIG. 2 to FIG. 5.

Figure 2:
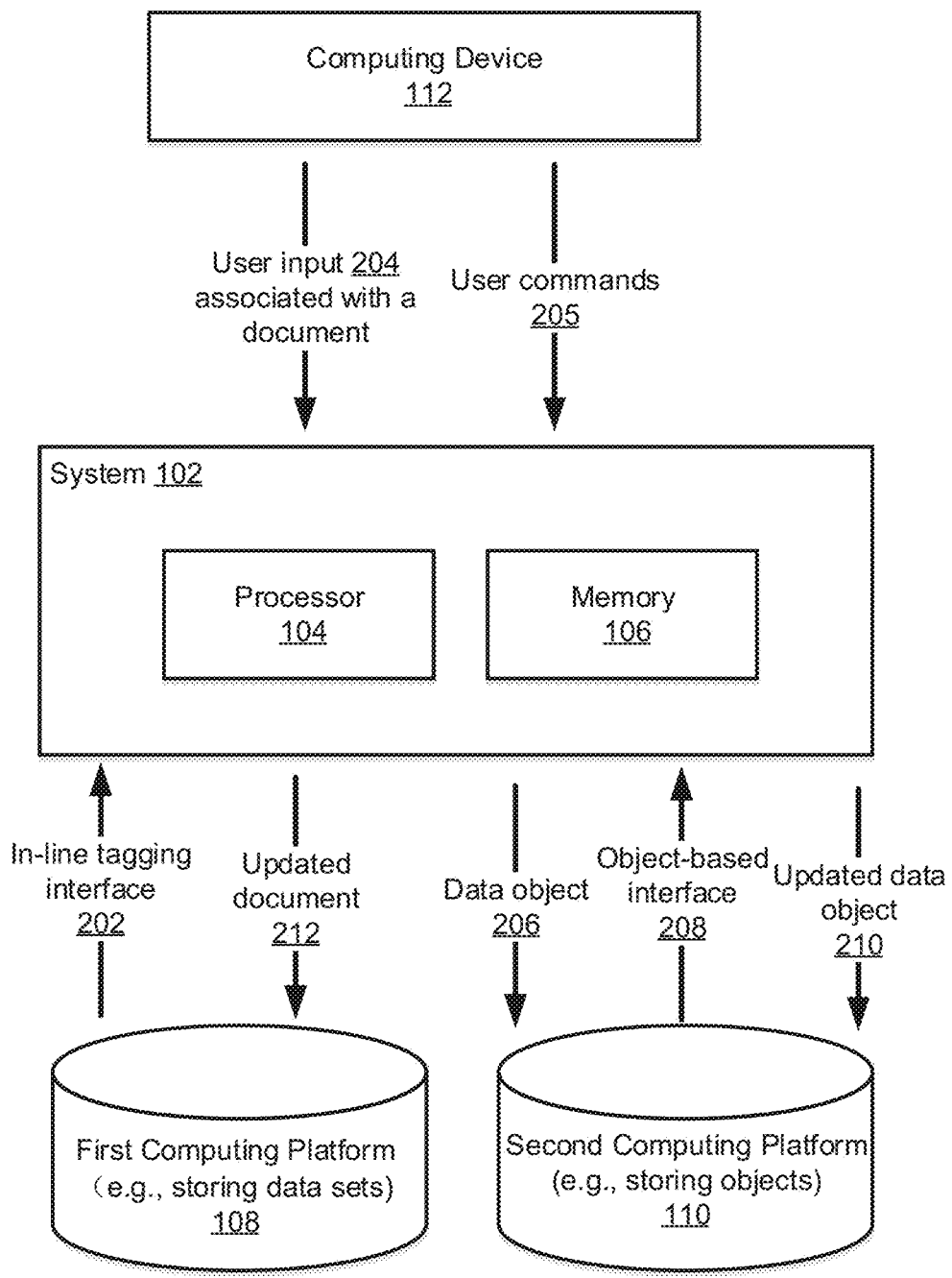
FIG. 2 illustrates an example system for in-line document tagging and object-based synchronization, in accordance with various embodiments.

FIG. 2 illustrates an example system for in-line document tagging and object-based synchronization, in accordance with various embodiments. The operations shown in FIG. 2 and presented below are intended to be illustrative. The systems and devices shown in FIG. 2 are the same as those described above with reference to FIG. 1.

In some embodiments, the system 102 may communicate with the first computing system 108 and provide an in-line tagging interface 202. The in-line tagging interface may not be object-based. A user may enter a user input via the in-line tagging interface. For example, the user may directly enter the user input to the system 102. In another example, the user may use the computing device 112 to enter the user input. Thus, the system 102 may receive the user input 204 via the in-line tagging interface. The user input 204 may be associated with one or more fields (e.g., text description field) of a document. Further, based on various user commands, such as the user commands 205 received at the system 102, the system 102 may apply one or more first document tags to the document. The one or more first document tags may be applied in-line with the received user input via the in-line tagging interface. The system 102 may further generate a data object 206 from the document based on the one or more first documents tags. The data object 206 may be associated with an object-based data modeling framework. The system 102 may provide the data object 206 for storage by a datastore (e.g., the second computing platform 110), the datastore comprising the object-based modeling framework.

In some embodiments, the system 102 may communicate with the second computing platform 110 and provide, via an object-based interface 208 under the object-based modeling framework, the data object 206. The user may enter user commands 205 to modify the provided data object 206 via the object-based interface 208, for example by applying one or more second documents tags. Thus, the system 102 may apply the one or more second document tags to the provided data object 206 (and correspondingly, to the document corresponding to the data object 206). The system 102 may update the data object 206 based on the one or more second documents tags to obtain an updated data object 210. The updated data object 210 may be stored in the second computing platform 110.

In some embodiments, the system 102 may further provide the document applied with the one or more first and second document tags (e.g., the updated document 212). Thus, the user may continue modifying the document from the in-line tagging interface 202, the document carrying the first and second document tags previously added from the first and second computing platforms respectively.

Referring to FIGS. 3A-4F, FIGS. 3A-4F illustrate example interfaces for in-line document tagging and object-based synchronization, in accordance with various embodiments. The description of FIGS. 3A-4F are intended to be illustrative and may be modified in various ways according to the implementation. The interfaces and various functionalities may be provided by the system 102.

In some embodiments, as shown in FIG. 3A, an in-line tagging interface 301 with text editing boxes is provided. In this example, the document may refer to the "report" as indicated in the interface. The document may comprise texts inputted to the "title" and "summary" text boxes (referred to as "user input"). Further, the user may select some of the inputted texts (e.g., "John Doe") to tag. With the user input "John Doe" being selected, the system 102 may search for objects related to "John Doe" and provide an dialogue box 311 showing the search results. For example, the system 102 may search various objects in the second computing platform 110 for object properties that contain the matching text "John Doe" and link the matching objects to the dialogue box 311. As shown, the dialogue box 311 returns objects like "John Doe's profile," "local news," "John Doe's activities," etc. The objects may be previously created. The each object may comprise one or more properties that can be used as the first document tags to tag the user input "John Doe." Additionally or alternatively, the dialogue box 311 can provide an option for creating a new object and associated properties for tagging "John Doe."

In some embodiments, applying the one or more first document tags to the document comprises creating the first document tag to associate with the user input, and/or selecting the first document tag to associate with the user input. In one example, the user input comprises a name. Selecting the first document tag to associate with the user input comprises selecting a property from a profile as the first document tag to associated with the user input. The profile is associated with the name. As shown in FIG. 3A, the user may select the object "John Doe's Profile" to bring up another dialogue box 312 showing corresponding properties of this object such as "phone number," "address," "nationality," "name," "email," etc. Here, the user may select the property "Name: John Doe" as the first document tag to tag the user input text "John Doe." Alternatively, the user may create a new tag as the first document tag for "John Doe" under the object "John Doe's Profile."

After being tagged, the user input "John Doe" may be rendered differently from other user inputs that are not tagged on the in-line tagging interface 302, as shown in FIG. 3B. In this case, for example, a tag icon is added to indicate that the highlighted text "John Doe" in the "summary" text box has been tagged.

In some embodiments, the user may use shortcuts to tag user inputs as she types. For example, as shown in the "Note" text box in FIG. 3B, the user may use a "@" sign to trigger a dialogue box 313 that provides an object search for the keyword "John Doe" typed after the "@" sign. Similar to the above description, the user may select the object "John Doe's Profile," triggering a dialogue box 314 showing the properties of the selected object. Here, the user may also select the property "Name: John Doe" to tag the "John Doe" entered in the "Note" text box. Once the property selection is performed, as shown on the in-line tagging interface 303 in FIG. 3C, the user input "@John Doe" may be replaced with a tag icon and a highlighted text "John Doe."

Alternatively, other properties of the object "John Doe's Profile" can be used to tag the user input "@John Doe." As shown in FIG. 3C, the object search for "John Doe" and the "John Doe's Profile" can be similarly invoked at dialog boxes 315 and 316 from the shortcut "@John Doe." This time, the user may pick the property "Email: Johndoe@email.com" as the first document tag for tagging the user input "@John Doe." Accordingly, as shown on the in-line tagging interface 304 in FIG. 3D, the user input "@John Doe" is replaced with a tag icon and a highlighted text "Email: Johndoe@email.com." As shown, selecting the first document tag to associate with the user input comprises replacing the user input with the selected first document tag. After the tagging is completed, the tagged text can be rendered differently from the other untagged texts to indicate the tag status.

In some embodiments, as shown in FIG. 3D, the system 102 may generate an object view 317 of the document with tags edited in the in-line tagging interface 304, upon saving the changes. Thus, the data object 206 corresponding to the document being edited may be created or updated in the second computing platform 110, the data object 206 carrying the first document tags edited in first computing platform 108.

The data object 206 can be loaded into an interface of the second computing platform 110 to allow review or further editing by the same or a different user. In some embodiments, as shown in FIG. 3E, the system 102 may provide the data object 206 on an object-based interface 305. Here, the tagged portions of the document are shown in bold and underline. The user may select any of the tagged portion to find details of the corresponding object. For example, the properties of the object "John Doe's Profile" can be provided on the dialogue box 318 when the tagged text is selected. Further, the user may modify the provided data object 206 via the object-based interface 208, such as by applying one or more second documents tags. For example, the user may select the text "Discovered too" to invoke a dialogue box 319 that provides search results for objects related to the selected text. The user may select one or more object properties to tag "Discovered too" from the object-based interface 305. The property selection is similar to the description above.

The system 102 may apply the one or more second document tags to the document corresponding to the data object 206. That is, the system 102 may synchronize the data object stored in the second computing platform 110 and the document stored in the first computing platform based on the added one or more second document tags. Thus, the latest version of the document and the corresponding data object both include all of the added tags. As shown in FIG. 3F, the system 102 may provide the document on the in-line tagging interface 306 with the three first document tags and the second document tag incorporated. From here, the user may continue modifying the document from the in-line tagging interface 306, for example, by adding more tags or changing the text. As such, different users may edit the document from the in-line tagging interface and the object-based interface, allowing collaborative effort for task completion. Each time, a reason for editing or other comments (e.g., "approved for publishing") can be entered in association with the document, further facilitating the collaboration.

Various methods can be used to edit a document that already has some tags and is loaded to the in-line tagging interface. In some embodiments, the system 102 may load the document into the in-line tagging interface 306 from the updated data object, identify one or more absolute locations of the document tags (e.g., the first document tags, the second document tags), and remove the document tags from the document. The system 102 may then apply one or more third document tags to the document based on the identified one or more absolute locations. The system 102 may edit at least a portion of the loaded document. This may allow, for example, the document to be edited (e.g., adding user input, removing user input, adding document tags, editing document tags, removing document tags, etc.) without causing shifting of the previously applied document tags, which can be a common problem when editing tagged documents. Once editing is complete, the system may synchronize the edits and the corresponding data object.

Figure 4A:
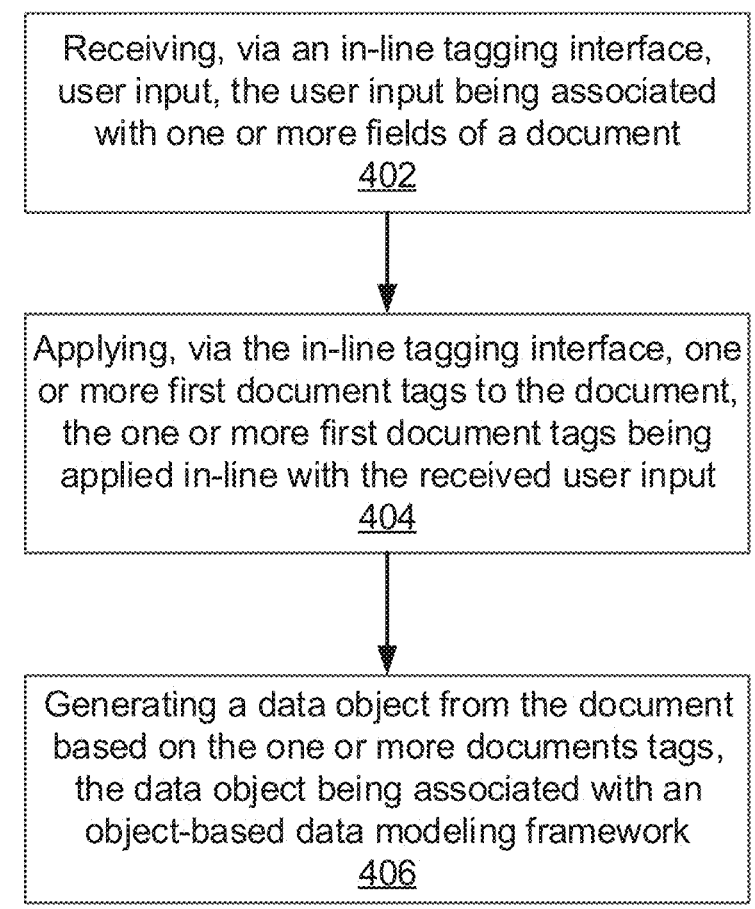
FIGS. 4A-4B illustrate flowcharts of an example method for in-line document tagging and object-based synchronization, in accordance with various embodiments.

FIG. 4A illustrates a flowchart of an example method 400 for in-line document tagging and object-based synchronization, according to various embodiments of the present disclosure. The method 400 may be implemented in various environments including, for example, the environment 100 of FIG. 1. The method 400 may be implemented by the system 102 (e.g., the processor 104, the memory 106). The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, user input may be received via an in-line tagging interface, the user input being associated with one or more fields of a document. At block 404, one or more first document tags may be applied to the document, the one or more first document tags being applied in-line with the received user input. At block 406, a data object may be generated from the document based on the one or more documents tags, the data object being associated with an object-based data modeling framework.

Figure 4B:
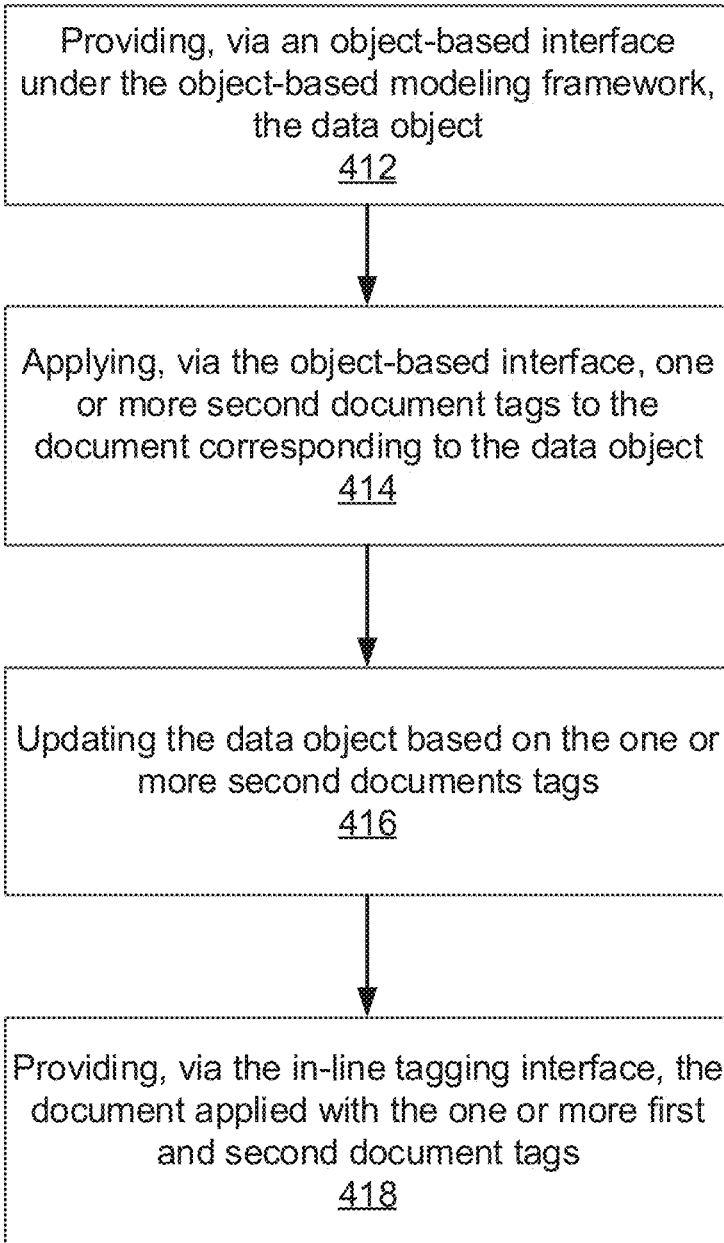

FIG. 4B illustrates a flowchart of an example method 410 for in-line document tagging and object-based synchronization, according to various embodiments of the present disclosure. The method 410 may be implemented in various environments including, for example, the environment 100 of FIG. 1. The method 410 may be implemented by the system 102 (e.g., the processor 104, the memory 106). The method 410 may be implemented after the method 400. The operations of method 410 presented below are intended to be illustrative. Depending on the implementation, the example method 410 may include additional, fewer, or alternative steps performed in various orders or in parallel. The example method 410 may be implemented in various computing systems or devices including one or more processors.

Continuing from the block 406 of the method 400 described above, at block 412, the data object may be provided via an object-based interface under the object-based modeling framework. At block 414, one or more second document tags may be applied to the document corresponding to the data object. At block 416, the data object may be updated based on the one or more second documents tags. At block 418, the document applied with the one or more first and second document tags may be provided.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
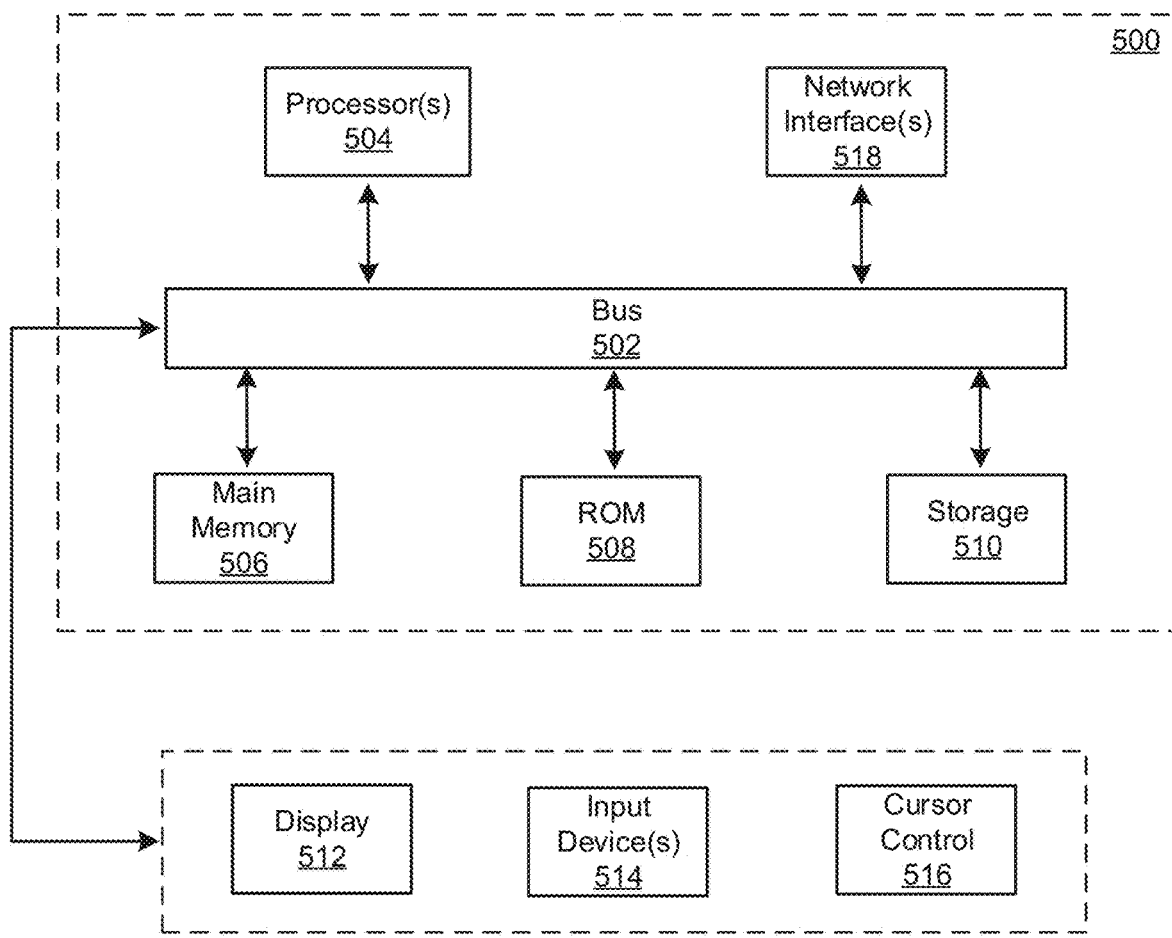
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors. The processor 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage device 510 may correspond to the memory 106 described above.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor. The display 512, the input device 514, and the cursor control 516 may be optional.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system for in-line document tagging and object-based synchronization, comprising:
   one or more processors; and
   memory storing instructions that, when executed by the one or more processors, cause the system to perform:
      receiving, via an in-line tagging interface of a first platform during creation of a document, user input, the user input being associated with one or more fields of the document being created, wherein the first platform is not object-based, and wherein the document is not object-based;
      applying one or more first document tags to the document being created, the one or more first document tags being applied in-line with the received user input; and
      generating a data object from the document based on the one or more first document tags, the data object being associated with an object-based second platform, the object-based second platform comprising an object-based data modeling framework.

2. The system of claim 1, wherein the instructions further cause the system to perform:
   providing the data object for storage by a datastore of the object-based second platform, the datastore comprising the object-based modeling framework.

3. The system of claim 1, wherein the instructions further cause the system to perform:
   providing, via an object-based interface under the object-based modeling framework, the data object;
   applying one or more second document tags to the document corresponding to the data object; and
   updating the data object based on the one or more second documents tags.

4. The system of claim 3, wherein the instructions further cause the system to perform:
   providing the document applied with the one or more first and second document tags.

5. The system of claim 1, wherein the in-line tagging interface is not object-based.

6. The system of claim 1, wherein applying the one or more first document tags to the document comprises at least one of:
   creating the first document tag to associate with the user input; or
   selecting the first document tag to associate with the user input.

7. The system of claim 6, wherein:
   selecting the first document tag to associate with the user input comprises replacing the user input with the selected first document tag.

8. The system of claim 6, wherein:
   the user input comprises a name;
   selecting the first document tag to associate with the user input comprises selecting a property from a profile as the first document tag to associated with the user input; and
   the profile is associated with the name.

9. A method for in-line document tagging and object-based synchronization, comprising:
   receiving, via an in-line tagging interface of a first platform during creation of a document, user input, the user input being associated with one or more fields of the document being created, wherein the first platform is not object-based, and wherein the document is not object-based;
   applying one or more first document tags to the document being created, the one or more first document tags being applied in-line with the received user input; and
   generating a data object from the document based on the one or more first document tags, the data object being associated with an object-based second platform, the object-based second platform comprising an object-based data modeling framework.

10. The method of claim 9, further comprising:
    providing the data object for storage by a datastore of the object-based second platform, the datastore comprising the object-based modeling framework.

11. The method of claim 9, further comprising:
providing, via an object-based interface under the object-based modeling framework, the data object;
applying one or more second document tags to the document corresponding to the data object; and
updating the data object based on the one or more second documents tags.

12. The method of claim 11, further comprising:
providing the document applied with the one or more first and second document tags.

13. The method of claim 9, wherein the in-line tagging interface is not object-based.

14. The method of claim 9, wherein applying the one or more first document tags to the document comprises at least one of:
creating the first document tag to associate with the user input; or
selecting the first document tag to associate with the user input.

15. The method of claim 14, wherein:
selecting the first document tag to associate with the user input comprises replacing the user input with the selected first document tag.

16. The method of claim 14, wherein:
the user input comprises a name;
selecting the first document tag to associate with the user input comprises selecting a property from a profile as the first document tag to associated with the user input; and
the profile is associated with the name.

17. A non-transitory computer-readable memory storing instructions that, when executed by one or more processors, cause the one or more processors to perform:
receiving, via an in-line tagging interface of a first platform during creation of a document, user input, the user input being associated with one or more fields of the document being created, wherein the first platform is not object-based, and wherein the document is not object-based;
applying one or more first document tags to the document being created, the one or more first document tags being applied in-line with the received user input; and
generating a data object from the document based on the one or more first document tags, the data object being associated with an object-based second platform, the object-based second platform comprising an object-based data modeling framework.

18. The non-transitory computer-readable memory of claim 17, wherein the instructions further cause the one or more processors to perform:
providing the data object for storage by a datastore, the datastore comprising the object-based modeling framework.

19. The non-transitory computer-readable memory of claim 17, wherein the instructions further cause the one or more processors to perform:
providing, via an object-based interface under the object-based modeling framework, the data object;
applying one or more second document tags to the document corresponding to the data object; and
updating the data object based on the one or more second documents tags.

20. The non-transitory computer-readable memory of claim 19, wherein the instructions further cause the one or more processors to perform:
providing the document applied with the one or more first and second document tags.

* * * * *